June 29, 1954    W. H. HENRICH    2,682,635
VOLTAGE REGULATOR FOR INVERTERS
Filed Feb. 29, 1952
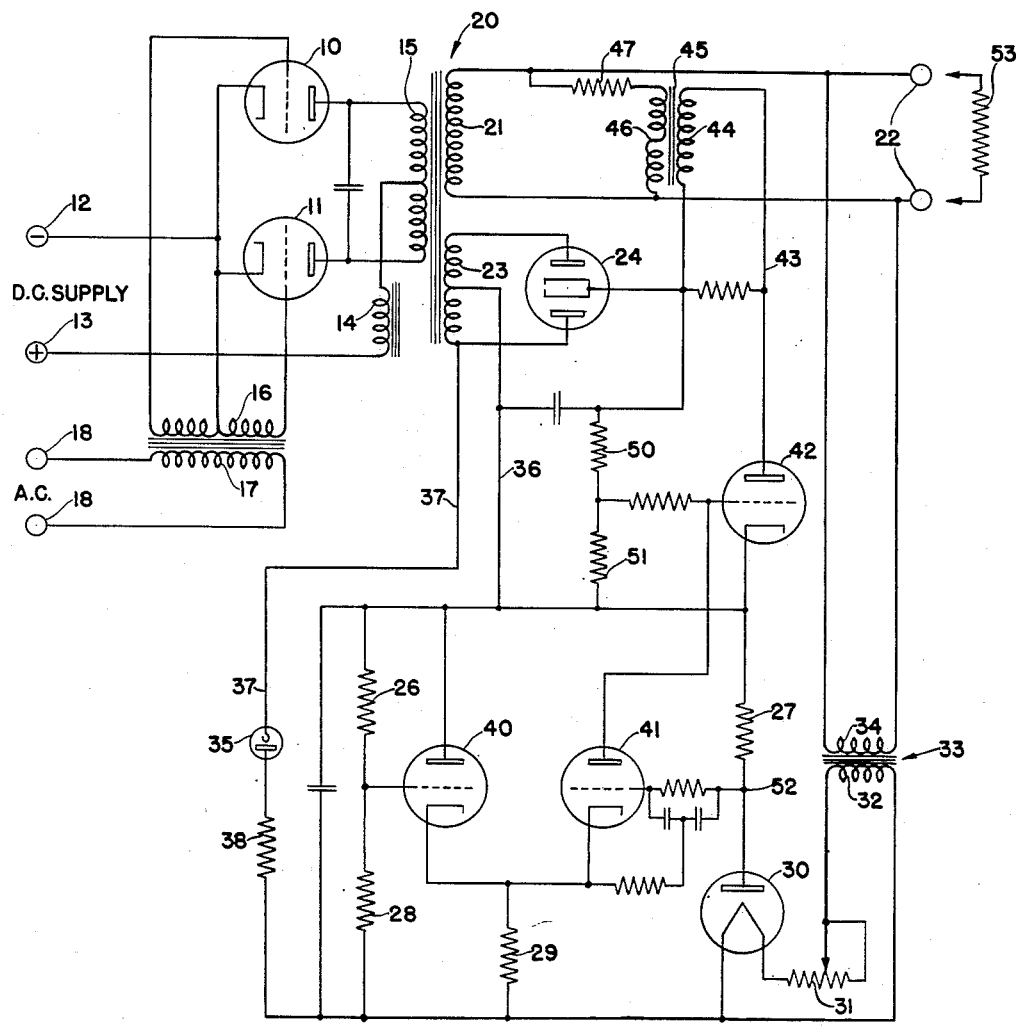
WILLIAM H. HENRICH
*INVENTOR.*
BY Ralph E. Bitner
*ATTORNEY*

Patented June 29, 1954

2,682,635

UNITED STATES PATENT OFFICE 2,682,635

VOLTAGE REGULATOR FOR INVERTERS

William H. Henrich, East Norwalk, Conn., assignor to Sorensen & Company, Inc., Stamford, Conn., a corporation of Connecticut Application February 29, 1952, Serial No. 274,241

4 Claims. (Cl. 323—66)

This invention relates to a voltage regulator used in connection with inverter circuits which change a direct current supply into alternating current of a desired frequency.

In the past various forms of voltage regulators have been constructed to control the voltage of an alternating current supply. Patent 2,455,143, issued November 30, 1948, to E. M. Sorensen describes one form of circuit used for this purpose. Another similar circuit is described in Patent 2,569,500, issued October 2, 1951, also to E. M. Sorensen. In these voltage regulators only a single amplifier stage is used to transmit the change in unbalance voltage to the control circuit which maintains the load voltage within a desired range. The present invention employs an amplifier system which is much more sensitive, provides closer control, and at the same time is flexible enough to operate under a wide variety of operating conditions.

One of the objects of this invention is to provide an improved regulating system which avoids one or more of the disadvantages and limitations of prior art arrangements.

Another object of the invention is to provide an alternating current voltage regulator which does not depend on a voltage standard of reference.

Another object of the invention is to provide a voltage regulator for inverters which is sensitive to output voltage changes and will maintain a constant voltage within a desired restricted range.

Another object of the invention is to provide a voltage regulating system for inverters which is flexible and can be adjusted to a varying output voltage.

The invention includes an inverter circuit in which a direct current source is converted into an alternating current wave, the frequency of which is determined by an external source. A transformer is used to deliver an alternating current to terminals where a load may be attached. A Wheatstone bridge arrangement is employed in the regulator circuit, one arm of which includes an electronic diode, the filament of which is lighted by a transformer connected directly to the output terminals. The remainder of the bridge includes three resistors, a supply system for obtaining a direct current supply through a rectifier and a third winding on the output transformer. A sensitive arrangement, comprising three vacuum tube amplifiers, is employed to sense the unbalanced condition of the bridge and to send a direct current through a saturable reactor which is bridged across the output terminals and which regulates the output voltage.

For a better understanding of the present invention, together with other and further objects thereof, reference is made to the following description taken in connection with the accompanying drawing.

The figure is a schematic diagram of connections showing all the regulator components in detail.

Referring now to the figure, two electronic tubes 10 and 11 are employed in an inverter circuit having their cathodes connected to a negative direct current supply terminal 12. The positive terminal 13 of the direct current supply is connected in series with an inductor 14 and the mid-point of a transformer primary winding 15. The anodes of tubes 10 and 11 are connected to the end points of winding 15. The cathodes of tubes 10 and 11 are also connected to the mid-point of a transformer winding 16, the ends points of this winding being connected to the control electrodes of the tubes. A primary winding 17 is connected to terminals 18 of an alternating current supply which is employed to determine the frequency of the inverter output. Output transformer 20 includes an output winding 21 which is connected directly to load terminals 22. Transformer 20 also includes a secondary winding 23 which is connected to a rectifier double-diode 24. The two anodes of tube 24 are connected to the end points of transformer winding 23 and the two cathodes are connected together to comprise the positive terminal of a rectified direct current source. The negative terminal of this supply system is connected to the mid-point of secondary winding 23.

A Wheatstone bridge arrangement is used as part of the circuit which produces an amplified form of the variations of the output voltage. This bridge comprises resistors 26, 27, and 28 for three arms of the bridge. The fourth arm comprises a diode 30, having a single anode and a tungsten filament for a cathode. The filament of diode 30 is connected through an adjustable resistor 31 to the secondary winding 32 of a step-down transformer 33. The primary winding 34 of this transformer is connected directly across the output terminals 22 and any variations in the load voltage will be applied directly to the filament in diode 30, causing its temperature and emissive characteristics to vary. The bridge circuit is supplied with rectified direct current from one half of winding 23 and a rectifier unit 35. The positive supply conductor 36 for this system connects the mid-point of winding 23 with the junction of resistors 26 and 27 and the negative supply conductor 37 connects the lower end of winding 23 through rectifier 35 and a resistor 38 to the junction of resistor 29 and the filament of diode 30.

In order to detect a change in output of this bridge system a direct current amplifier is employed, comprising three stages and using triodes 40, 41, and 42. Triodes 40 and 41 have a common cathode resistor 29 and because of this connection triode 40 supplies triode 41 with a positive cathode bias. A change in potential of point 52 will be applied directly between the control electrode of triode 41 and the lower end of resistor 29. This change in potential will, in effect, be applied between the control electrode of triode 41 and its cathode since triode 40 maintains a constant potential across cathode resistor 29. The output of triode 41 is applied through its anode conductor to the control electrode of triode 42 and the anode current of this tube sent over conductor 43 through a direct current winding 44 of a saturable core reactor 45 to the cathodes of rectifier tube 24. The alternating current windings 46, in series with a resistor 47, are bridged across the output conductors which are connected to terminals 22. The bias potential for the control electrode of triode 42 is obtained from a voltage divider circuit which includes resistors 50 and 51 connected across the terminals of the rectifier system 23, 24.

The operation of this circuit is as follows: Let it first be assumed that the system is balanced and the output voltage is within the desired range. The filament in anode 30 is heated to an average temperature, controlled in part by the setting of variable resistor 31. The anode-cathode resistance of diode 30 is also an average value which can be either increased or lowered by a change of the filament temperature. At this setting the bridge is not necessarily balanced; that is, the junction point of resistors 26 and 28 need not be at the same potential as point 52. The anode currents through triodes 40, 40 and 42 are stable and the resulting reactance in alternating current winding 46 is just sufficient to maintain the output voltage at the desired value.

Now if a load 53 connected to terminals 22 is increased in resistance value the load voltage will be increased and the filamentary cathode in diode 30 will be heated to a higher temperature thereby lowering the resistance between the anode and cathode and lowering the potential of point 52. This action causes the potential of the anode in triode 41 and the control electrode in triode 42 to rise, thereby increasing the anode current through winding 44 to lower the reactance in winding 46 and return the voltage across the load terminals 22 to the desired value.

Resistor 31 may be manually set to obtain any desired voltage at the output terminals within a wide range. A change in setting of this resistor has the same general effect as a change in load voltage since it operates to change the temperature of the filament in diode 30.

The following circuit constants may be used in the circuit shown in the figure, and are illustrative of a specific application of the invention.

Resistor 31 _____ ohms__ 5
Resistors 26, 27, and 28 _____ megohms__ 1
Resistors 38 and 51 _____ ohms__ 47,000
Resistor 50 _____ do____ 470,000

From the above description it will be evident that the invention provides a system for regulating the output voltage of an inverter circuit in accordance with the above mentioned objects.

While there have been described and illustrated specific embodiments of the invention, it will be obvious that various changes and modifications may be made therein without departing from the field of the invention which should be limited only by the scope of the appended claims.

I claim:

1. A voltage regulator for an inverter comprising, a transformer in the inverter output circuit having one secondary winding which delivers alternating current power to a load circuit and another secondary winding which delivers alternating current power to one or more rectifier circuits, a bridge network including a diode electron tube as one of the arms thereof, said diode having an anode and a filamentary cathode, circuit means connected across the load circuit for applying a voltage to the filament of said diode to determine its emissive characteristic and the associated impedance of the diode, an amplifier connected across said bridge and responsive to the change in the impedance of said diode, and a saturable core reactor controlled by the output of said amplifier and connected across the load circuit for altering the reactance thereof and controlling the output voltage to be maintained within a predetermined restricted range, said amplifier comprising a first amplifier tube having its control electrode and cathode connected across the diode and a second amplifier tube having its control electrode and cathode connected across a resistor in said bridge.

2. A voltage regulator for an inverter comprising, a transformer in the inverter output circuit having one secondary winding which delivers alternating current power to a load circuit and another secondary winding which delivers alternating current power to one or more rectifier circuits, a bridge network including a diode electron tube as one of the arms thereof, said diode having an anode and a filamentary cathode, circuit means connected across the load circuit for applying a voltage to the filament of said diode to determine its emissive characteristic and the associated impedance of the diode, an amplifier circuit having its input connected across the bridge and responsive to the change in impedance of said diode and the associated change in voltage unbalance of the bridge circuit, and a saturable core reactor controlled by the output of said amplifier circuit and connected across the load circuit for altering the reactance thereof and controlling the output voltage to be maintained within a predetermined restricted range, said amplifier circuit comprising a first amplifier tube having at least an anode, a cathode, and a control electrode, with said control electrode connected to the diode anode and with said cathode connected through a cathode resistor to the diode filament, a second amplifier tube also having at least an anode, a cathode, and a control electrode, with said control electrode connected to the junction point of two of the bridge resistors and said cathode connected through the cathode resistor to the diode filament.

3. A voltage regulator for an inverter comprising, an output circuit for delivering alternating current power to a load, a bridge network including a diode electron tube as one of the arms thereof, said diode having an anode and a filamentary cathode, circuit translating means connected across the load for applying a voltage to the filament of said diode to determine its emissive characteristic and the associated impedance of the diode, an amplifier circuit having its input connected across the bridge and responsive to the change in impedance of said diode and the associated change in voltage unbalance of the bridge circuit; a saturable core reactor having an alternating current winding and a direct current winding, the alternating current winding connected across the load for controlling the output voltage and the direct current winding connected to an output circuit of said amplifier for controlling the reactance of the alternating current winding in conformity with the degree of change in bridge unbalance; said amplifier circuit comprising a first amplifier tube having at least an anode, a cathode and a control electrode, with the control electrode connected to the diode anode and with the cathode connected through a cathode resistor to the diode filament; a second amplifier tube with some of its electrodes connected to points in the bridge circuit and its cathode connected through the cathode resistor to the diode filament.

4. A voltage regulator for an inverter comprising, an output circuit for delivering alternating current power to a load, a bridge network including a diode electron tube as one of the arms thereof, said diode having an anode and a filamentary cathode, circuit translating means connected across the load for applying a voltage to the filament of said diode to determine its emissive characteristic and the associated impedance of the diode, an amplifier circuit having its input connected across the bridge network and responsive to the change in impedance of said diode and the associated change in voltage unbalance of the bridge circuit; a saturable core reactor having an alternating current winding and a direct current winding, the alternating current winding connected across the load for controlling the output voltage, and the direct current winding connected to an output circuit of said amplifier for controlling the reactance of the alternating current winding in conformity with the degree of change in bridge unbalanced; rectifier means derived from the inverter output circuit for supplying both the amplifier circuit and the bridge network with a direct current supply voltage; said amplifier circuit comprising a first and second amplifier tube having a cathode, an anode, and a control electrode, the first amplifier tube having its control electrode connected to the diode anode, the second amplifier tube having its control electrode connected to a point in the bridge network opposite the diode anode, and a common resistor in the cathode circuits of said amplifier tubes for maintaining a desired potential on the cathode of said first amplifier tube.

References Cited in the file of this patent

UNITED STATES PATENTS

| Number | Name | Date |
| --- | --- | --- |
| 2,576,014 | Helterline et al. | Nov. 20, 1951 |